Dec. 19, 1967    D. R. BROSIOUS    3,359,486
EDDY CURRENT SEAM TRACKING DEVICE UTILIZING AN E-SHAPED
CORE WITH ELECTROMAGNETICALLY UNEQUAL PICK-UP COILS
Filed Aug. 6, 1963    7 Sheets-Sheet 1

INVENTOR.
Daniel R. Brosious

INVENTOR.
Daniel R. Brosious

INVENTOR.
Daniel R. Brosious

Dec. 19, 1967   D. R. BROSIOUS   3,359,486
EDDY CURRENT SEAM TRACKING DEVICE UTILIZING AN E-SHAPED
CORE WITH ELECTROMAGNETICALLY UNEQUAL PICK-UP COILS
Filed Aug. 6, 1963   7 Sheets-Sheet 5

INVENTOR.
Daniel R. Brosious

INVENTOR.
Daniel R. Brosious

United States Patent Office 3,359,486
Patented Dec. 19, 1967

3,359,486
EDDY CURRENT SEAM TRACKING DEVICE UTILIZING AN E-SHAPED CORE WITH ELECTROMAGNETICALLY UNEQUAL PICK-UP COILS
Daniel R. Brosious, Bethlehem, Pa., assignor, by mesne assignments, to Bethlehem Steel Corporation, a corporation of Delaware
Filed Aug. 6, 1963, Ser. No. 300,211
5 Claims. (Cl. 324—40)

This invention relates to apparatus for electromagnetically locating a seam or discontinuity in conductive materials. More particularly, it relates to apparatus for inducing eddy currents of a predetermined distribution in conductive materials and detecting any departure from said predetermined distribution as the apparatus is moved relative to the materials. In addition, this invention relates to a novel phase detector circuit which produces a D.C. signal the magnitude and polarity of which are dependent upon the magnitude and direction of phase shift of an A.C. signal.

The invention will be described in detail in connection with automatic positioning devices. For example, in the automatic welding of a seam it is desirable to maintain the welding electrodes centered with respect to the seam as the welding agency is moved relative to the materials forming the seam. It is thus necessary to provide sensing means for continuously producing an electrical signal indicative of the position of the welding electrodes with respect to the seam and further means which utilizes said signal to automatically re-position either the welding agency or the materials forming the seam when said signal indicates that the electrodes are not centered with respect to the seam.

The sensing means of the invention produces an A.C. signal which varies in phase as the position of the electrodes varies with respect to the seam. In order to accurately sense small changes in position it is essential that circuit means, e.g., a phase detector circuit, be provided which produces a large D.C. signal when said A.C. signal shifts in phase through a small angle, e.g., a few degrees. In addition, said circuit should produce a signal indicative of the magnitude and direction of phase shift.

It is an object of this invention to provide an apparatus for inducing eddy currents of a predetermined distribution in conductive materials and detecting any departure from said predetermined distribution as the apparatus is moved relative to the materials. It is a further object to provide such an apparatus which is relatively uninfluenced by electrical noise and other amplitude phenomena.

It is a still further object of the invention to provide an apparatus for continuously centering a member with respect to a seam formed by conductive materials.

It is another object of the invention to provide an apparatus which produces an A.C. signal which varies in phase as the eddy current distribution varies in the materials under test.

A further object is to provide a phase detector circuit which produces a relatively large D.C. signal when an A.C. test signal shifts in phase through a relatively small angle. A still further object is to provide such a circuit in which the magnitude and polarity of said D.C. signal are dependent upon the magnitude and direction of phase shift.

To achieve the foregoing objects, I provide an eddy current probe comprising a ferromagnetic E-shaped core having a base, an inner leg, and first and second outer legs. First coil means comprising an excitation coil is wound about said inner leg and second coil means comprising first and second pick-up coils are wound about said first and second outer legs, respectively. The excitation coil is connected to a source of alternating current and the two pick-up coils are connected, in series-opposition, across a capacitor to form a parallel resonant circuit resonant at the frequency of said alternating current. A plurality of circuits, to be described hereinafter, connects the resonant circuit to a phase detector circuit which produces a D.C. signal the magnitude and polarity of which are dependent upon the difference in phase between the voltage across the resonant circuit and a reference voltage of the same frequency.

The probe is positioned in inductive relation with conductive materials forming a seam. The probe is disposed with its long axis transverse to the seam and with its inner leg centered directly above the seam. The excitation coil is then energized so that eddy currents are induced in said materials. When the inner leg is centered directly above the seam, the eddy currents on each side of the seam are substantially equal in magnitude. The probe is constructed so that there is no net voltage induced in said pick-up coils by the magnetic flux produced by said eddy currents when the probe is so positioned. The probe is further constructed so that a net voltage of minimum magnitude is always across the pick-up coils by reason of the magnetic flux produced by the current in the excitation coil.

Because of the hysteresis in the materials, and also because of the inductance of the coils, the voltage induced in said pick-up coils by the excitation current and the voltage induced in said pick-up coils by said eddy currents are out of phase with each other. Thus, the net voltage across said pick-up coils, and consequently across the resonant circuit, is the vectorial sum of said voltages.

The net voltage across the resonant circuit is fed through a plurality of circuits to a phase detector circuit which compares the phase of said voltage with that of a reference voltage of the same frequency. The phase detector circuit is constructed so that there is no output therefrom when the net voltage across the resonant circuit is due to flux produced by the excitation current only. However, when the net voltage across the resonant circuit is due to the combined effects of the excitation current flux and the eddy current flux, said voltage differs in phase from the voltage induced in said pick-up coils by the excitation current flux only, and the phase detector circuit produces a D.C. signal the magnitude and polarity of which are indicative of the magnitude and direction of the phase difference. Such a condition exists when the inner leg of the probe is not centered directly above the seam, inasmuch as the eddy currents on each side of the seam are then not substantially equal in magnitude, and the voltages induced in said pick-up coils by the magnetic flux produced by said eddy currents are consequently unequal in magnitude.

The features of the invention which I believe to be novel are set forth with particularity in the appended claims. Both the structure and the method of operation of the invention, as well as further objects and advantages thereof, will be better understood by reference to the following description taken in connection with the drawings, in which:

Figure 1:
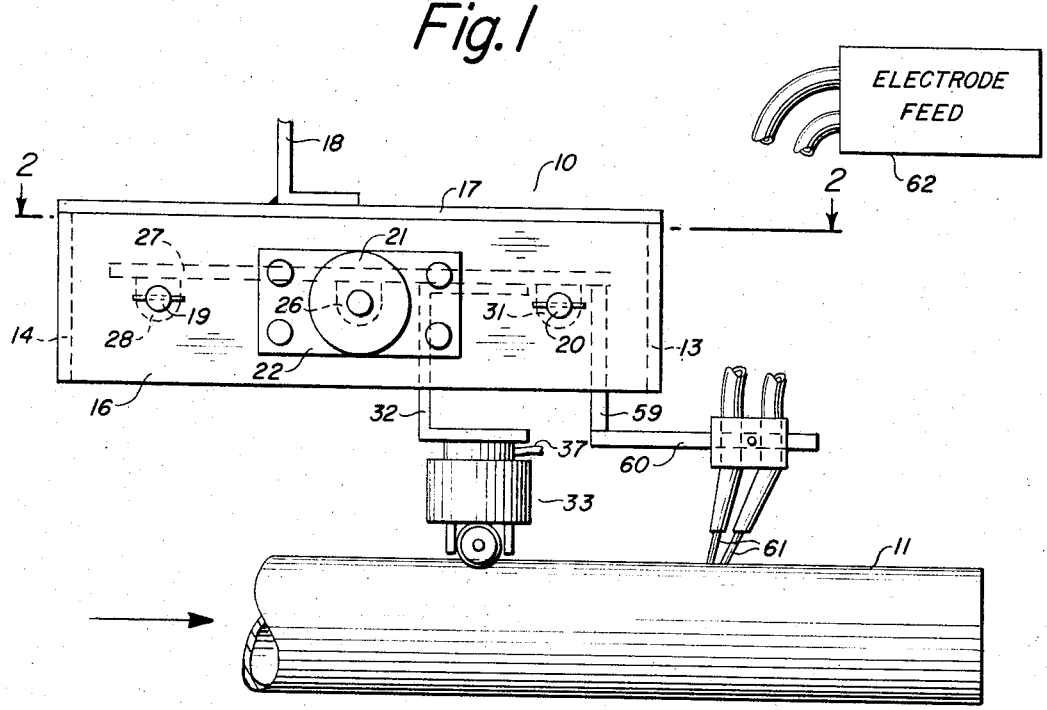
FIGURE 1 is a side elevational view of an arc welding apparatus including a positioning control apparatus embodying certain of the principles of the present invention.
Figure 2:
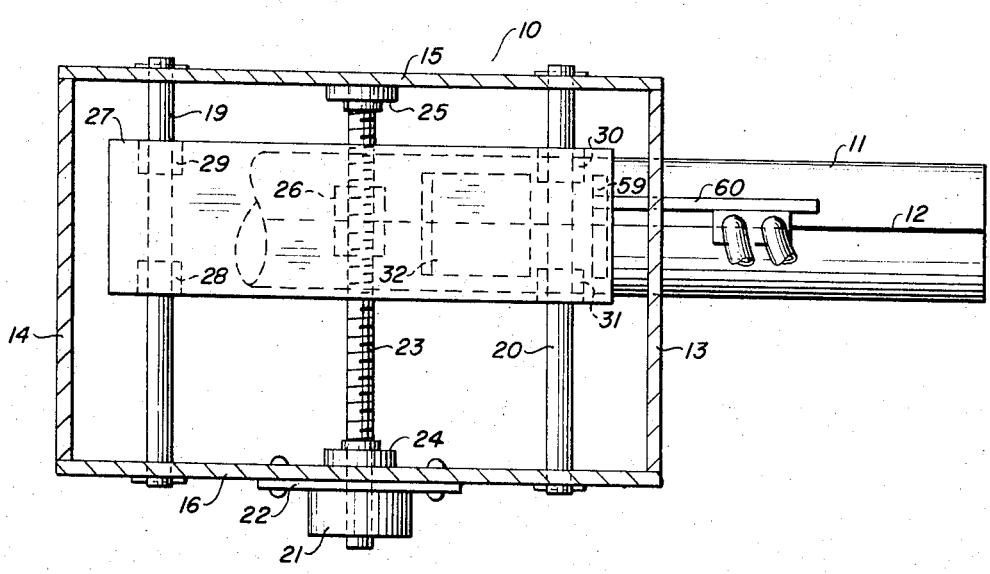
FIGURE 2 is a sectional view of said apparatus taken along the line 2—2 of FIGURE 1.

As is shown in FIGURES 1 and 2, the positioning control apparatus broadly comprises a supporting structure 10 which is disposed above a pipe 11 the longitudinal seam 12 of which has been welded along the inside thereof and has just begun to be welded along the outside thereof. The structure 10 comprises side plates 13 and 14, end plates 15 and 16, and cover plate 17. The cover plate 17 is welded to a bracket 18 which depends from a suitable support (not shown).

Journaled within the end plates 15 and 16 are rods 19 and 20. Motive power means, e.g., a reversible A.C. motor 21, is affixed to a motor mounting plate 22 which is riveted to the end plate 16. The shaft of the motor 21 is adapted to rotate a worm 23 which is journaled in bushings 24 and 25. The worm 23 threadedly engages a nut 26 which is rigidly attached to the bottom of a carriage 27. The carriage 27 is provided with bushings 28 and 29 in which rod 19 is journaled and bushings 30 and 31 in which rod 20 is journaled. Rotation of the shaft of the motor 21 thus drives the carriage 27 along the rods 19 and 20.

Figure 3:
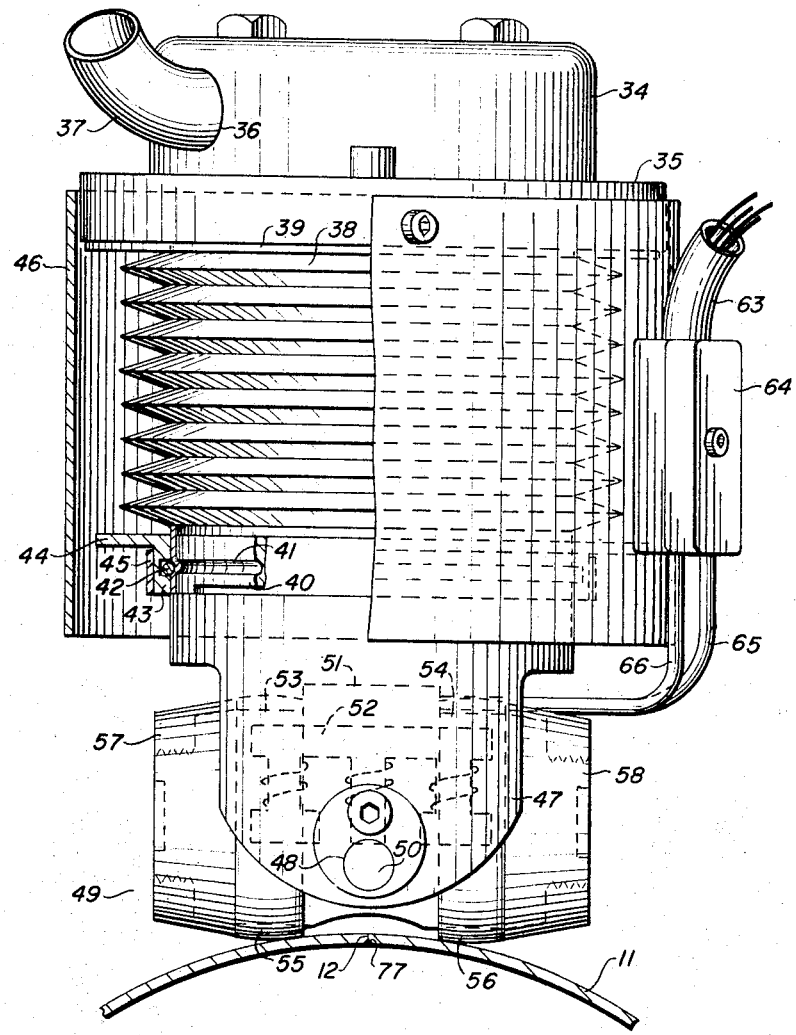
FIGURE 3 is a side elevational view, partly in section, of a supporting apparatus for an eddy current probe.

Attached to the bottom of the carriage 27 is a U-bracket 32 to which the probe supporting apparatus 33 is affixed. The apparatus 33, shown in detail in FIGURE 3, broadly comprises a circular head 34 having an annular collar 35. The head 34 is provided with an opening 36 through which air is supplied by a flexible hose 37. A bellows 38 in attached to the bottom of the annular collar 35 by means of a sealing ring 39. The bottom of the bellows 38 encircles a supporting ring 40 having a circumferential groove 41. The bellows 38 is affixed to the ring 40 by means of a ring clamp 42. A shield 43 having an annular flange 44 is circumferentially disposed about the bottom of the bellows 38 by means of the ring clamp 45. The outer edge of the flange 44 is adjacent the inner surface of the cylindrical casing 46 which is bolted to the collar 35. The bellows 38 is thus protected from damage due to sparks, rough handling, etc.

A trunnion fork 47 is bolted to the bottom of the ring 40 and is provided with journals 48. A sensing head 49 is pivotally mounted in the fork 47 by means of pins 50 inserted in the journals 48.

The sensing head 49 broadly comprises a body section 51 in which the eddy current probe 52 is housed. The body section 51 has two cylindrical projections 53 and 54 about which wheels 55 and 56 are placed. The ends of said projections are threaded whereby nuts 57 and 58 can be secured thereto.

Returning to FIGURE 1, a plate 59 is shown depending from one side of the carriage 27. Another plate 60 extends horizontally from the plate 59 and provides mounting means for the electrodes 61. The electrodes 61 are automatically fed to the seam 12 by means of the electrode feed apparatus 62, which is rigidly mounted in the vicinity of the supporting structure 10.

Means, not shown, are provided for driving the pipe 11 longitudinally whereby the seam 12 of the pipe 11 progressively passes under the structure 10. Further means, also not shown, are provided for rotating the pipe 11 whereby the seam 12 is substantially in the vicinity of the electrodes 61. Inasmuch as the electrodes 61 may not be centered directly above the seam 12, it is necessary to sense the position of the seam 12 with respect to the electrodes 61 and re-position the carriage 27 if the eddy current probe 52 and its associated circuits indicate that re-positioning is desired. The electrical connectors between the probe 52 and its associated circuits are encased in a flexible tube 63 which is affixed to a connector block 64. The block 64 is mounted on the casing 46 and is provided with flexible conduits 65 and 66 through which the connectors pass to the probe 52.

Broadly, the above-described apparatuses operate in substantially the following manner. The trunnion fork 47 is retracted within the casing 46 by removing the air in the bellows 38 through the hose 37. The pipe 11 is then driven longitudinally and rotated until the beginning of the seam is substantially under the electrodes 61. The fork 47 is then lowered, by supplying air through the hose 37, until the wheels 55 and 56 of the sensing head 49 rest on the surface of the pipe 11. The eddy current probe 52 is excited and produces an A.C. signal the phase of which is dependent upon the position of the probe 52 with respect to the seam 12. The signal from the probe 52 is utilized to energize the motor 21 to drive the carriage 27 along the rods 19 and 20 until the probe 52 is centered directly over the seam 12. By reason of the aforementioned mechanical linkage between the probe 52 and the electrodes 61, said electrodes are then also centered directly over the seam 12.

The welding current is then turned on and the pipe 11 is driven longitudinally whereby the pipe 11 progressively passes under the structure 10. Should the transverse position of the seam vary along the length of the pipe, thereby causing a lateral displacement of the seam 12 with respect to the electrodes 61, there is a corresponding lateral displacement of the seam 12 with respect to the probe 52. Said displacement alters the eddy current distribution in the pipe 11 adjacent the seam 12 thereof. That is, the eddy currents increase in magnitude on one side of the seam 12 and decrease in magnitude on the other side of the seam 12. The change in eddy current distribution results in a phase shift in the voltage across the pick-up coils, the magnitude of the phase shift being dependent upon the magnitude of the change in eddy current distribution, the hysteresis of the pipe material, and the inductance of the probe, as will be described in detail later in the specification. The phase shift in the voltage across the pick-up coils is converted by a plurality of circuits, including a phase detector circuit, into a D.C. signal which is fed to a motor control circuit. The motor control circuit, in response to said signal, energizes the motor 21 which drives the carriage 27 laterally with respect to the seam 12 until the probe 52, and thus the electrodes 61, is centered directly above the seam 12.

Figure 4:
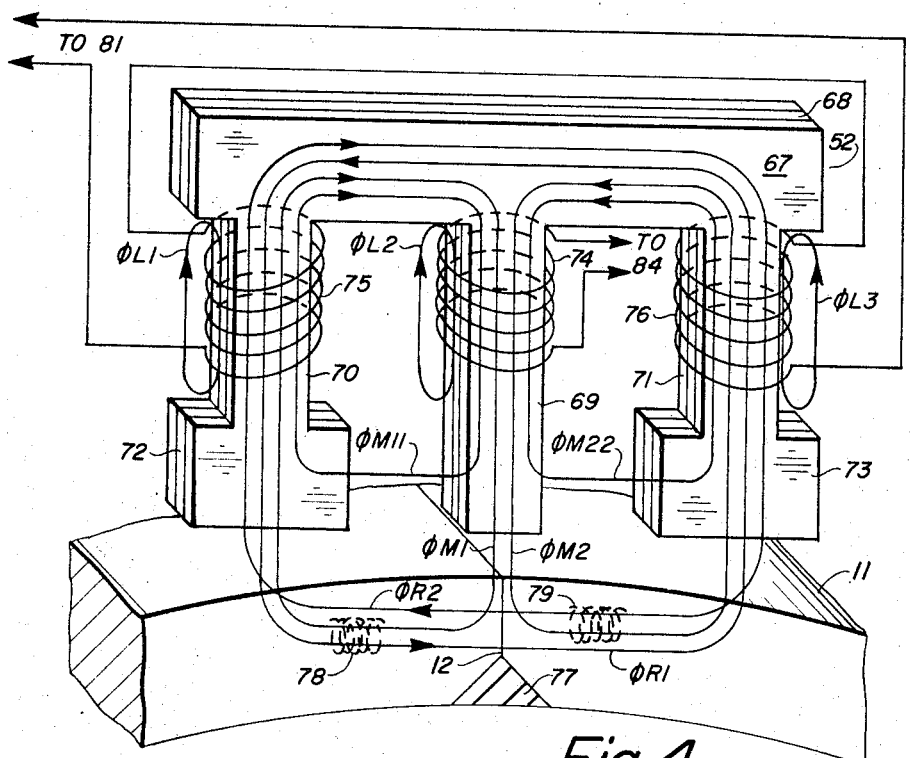
FIGURE 4 is an end elevational view of the eddy current probe disposed in inductive relation with conductive materials forming a seam.

The eddy current probe 52 of the invention is shown in detail in FIGURE 4 as comprising a symmetrical E-shaped core 67 having a base 68, an inner leg 69, and first and second outer legs 70 and 71, respectively. It is essential to the invention, for reasons to be later explained, that the core 67 be constructed of a low Q ferromagnetic material, e.g., low grade silicon sheet steel.

The geometry of the core 67, which preferably is laminated to reduce the magnitude of eddy currents induced therein, is such that the reluctance between the inner leg 69 and the pipe 11 is substantially greater than the reluctance between either outer leg 70, or 71, and the pipe 11. This geometric relationship is preferably attained by providing the outer legs 70 and 71 with integral pole pieces 72 and 73, respectively, the cross-sectional areas of which are large in comparison with the cross-sectional area of the inner leg 69.

Wound about the inner leg 69 is an excitation coil 74. Wound about the outer legs 70 and 71 are low Q pick-up coils 75 and 76, respectively. Coils 75 and 76 are connected in series-opposition, insofar as voltages induced therein by the excitation fluxes produced by alternating current in coil 74 are concerned. It is essential to the invention that the coils 75 and 76 be electromagnetically unequal whereby different voltages are induced in said coils by the excitation fluxes. The electromagnetic inequality can be achieved by providing different magnetic paths for each pick-up coil, by providing each pick-up coil with a different number of turns, or by providing a combination of different magnetic paths and a different number of turns. In the preferred embodiment of the invention, said inequality is obtained by adjusting the relative positions of the pick-up coils on the outer legs (differing the magnetic paths) and by winding the pick-up coils so that one of said pick-up coils has from one to five, and preferably three, per cent less turns than the other pick-up coil.

The probe 52 operates in substantially the following manner. Alternating current, the frequency of which is determined by the electrical characteristics of the materials forming the seam 12 and the desired depth of penetration of the eddy currents to be induced therein, is fed to the excitation coil 74. A frequency within the very low frequency (VLF) range, e.g., 5000 c.p.s., has been found to be optimum for as-rolled mild steel pipe ⅜ inch thick in which the inside weld has penetrated 80%.

Alternating current in the excitation coil 74 results in fluxes in the core 67 of the probe 52 and the pipe 11. For purposes of analysis, the pertinent fluxes are shown in FIGURE 4.

The main flux $\phi M$, i.e., the flux resulting from the alternating current in the excitation coil 74, is represented in terms of several component fluxes. Two components, $\phi M1$ and $\phi M2$, leave the inner leg 69 of the core 67 and inductively couple the probe 52 to the pipe 11. When the probe 52 is properly positioned with respect to the seam 12, $\phi M1$ enters the pipe 11 on one side of the seam 12 while $\phi M2$ enters the pipe 11 on the other side of the seam 12. $\phi M1$ and $\phi M2$ leave the pipe 11 and return to the core 67 through pole pieces 72 and 73, respectively. By reason of the symmetry of the core 67, $\phi M1$ and $\phi M2$ are substantially equal in magnitude and in phase within the excitation coil 74, and are substantially equal in magnitude and 180° out of phase within the electrically connected pick-up coils 75 and 76.

Another two components, $\phi M11$ and $\phi M22$, of the main flux $\phi M$ leave the inner leg 69 and pass directly to the pole pieces 72 and 73, respectively. Said components, which do not contribute to the inductive coupling between the probe 52 and the pipe 11, are substantially equal in magnitude and in phase within the inner leg 69 and substantially equal in magnitude and 180° out of phase within the electrically connected pick-up coils 75 and 76. An additional component $\phi L2$ is a leakage flux which leaves the inner leg 69 and returns directly thereto via air.

The foregoing can be expressed mathematically as:

$\phi M = \phi M1 + \phi M2 + \phi M11 + \phi M22 + \phi L2$ (vector sum)

Inasmuch as one of the primary functions of the probe 52 is to induce eddy currents in the pipe 11, fluxes $\phi M1$ and $\phi M2$ should be relatively large with respect to fluxes $\phi M11$ and $\phi M22$. The outer legs 70 and 71 are thus so disposed with respect to the inner leg 69 that, when the sensing head 49 is resting on the pipe 11, the reluctance between each of the pole pieces 72 and 73 and the leg 69 is substantially greater than the sum of the reluctances between the leg 69 and the pipe 11 and either pole piece 72 or 73 and the pipe 11.

The fluxes produced by the current in the pick-up coils 75 and 76 due to the voltage induced therein by components of the main flux $\phi M$ passing therethrough are labeled in FIGURE 4 as $\phi L1$ and $\phi L3$, respectively. The net flux $\phi L$ within the pick-up coils due to said current is substantially equal to the vector sum of $\phi L1$ and $\phi L3$.

When the probe 52 is inductively coupled to the materials forming the seam 12, the laternating fluxes $\phi M1$ and $\phi M2$ induce in the materials eddy currents the magnitudes of which may be large if the electrical conductivity of the materials is high. The eddy currents are confined to areas adjacent the seam 12 by supplying the coil 74 with current of a frequency for which the resultant eddy currents are restricted substantially to the surface of the pipe 11. The eddy currents thus cannot cross the seam 12 via the inside longitudinal weld 77. For the purpose of analysis, the individual eddy currents induced on each side of the seam 12 have been integrated and are represented in dotted lines as 78 and 79, respectively.

Figure 5:
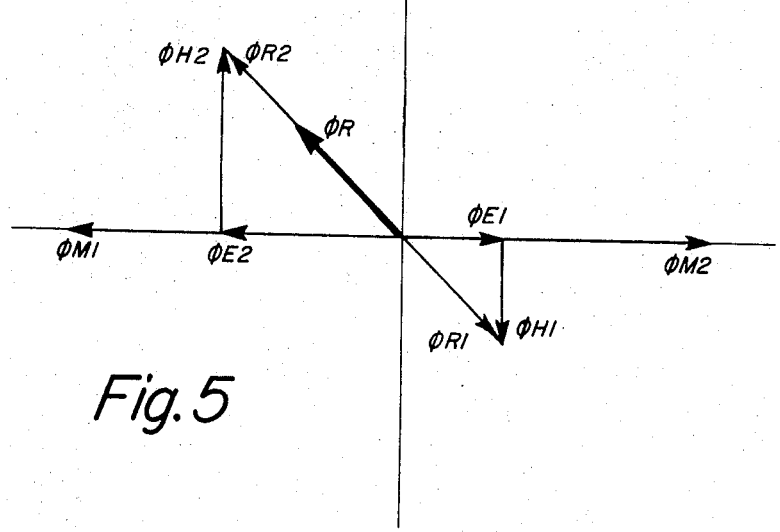
FIGURE 5 is a vector diagram of the fluxes in the materials due to eddy currents induced therein.

The eddy currents 78 and 79, which are 180° out of phase with each other, produce fluxes $\phi R1$ and $\phi R2$, respectively. Said fluxes, which would be substantially 180° out of phase with fluxes $\phi M1$ and $\phi M2$, respectively, were the materials forming the seam 12 not characterized by hysteresis, are shown as vectors in FIG. 5. Flux $\phi R1$ comprises a component $\phi E1$ 180° out of phase with $\phi M1$ and a quadrature component $\phi H1$ due to hysteresis. Similarly, $\phi R2$ comprises a component $\phi E2$ 180° out of phase with $\phi M2$ and a quadrature component $\phi H2$ due to hysteresis. Flux $\phi R$ is the resultant eddy current flux across the seam 12 when $\phi R1$ and $\phi R2$ are unequal, a condition which exists when the inner leg 69 of the probe 52 is not centered directly above the seam 12. Mathematically expressed, $\phi R$ is the vector sum of $\phi R1$ and $\phi R2$.

It is to be noted that the paths of fluxes $\phi R1$ and $\phi R2$ do not include the inner leg 69 of the probe 52 and also that the path of each of said fluxes includes both of the outer legs 70 and 71. Flux $\phi R$ thus passes through the pick-up coils 75 and 76 in such a direction that the voltages induced in said coils by said flux add rather than subtract. Thus, while the pick-up coils 75 and 76 are connected in series-opposition insofar as the voltages induced therein by the main flux $\phi M$ are concerned, the pick-up coils 75 and 76 are connected in series-aiding insofar as the voltages induced therein by the resultant eddy current flux $\phi R$ are concerned.

Figure 6:
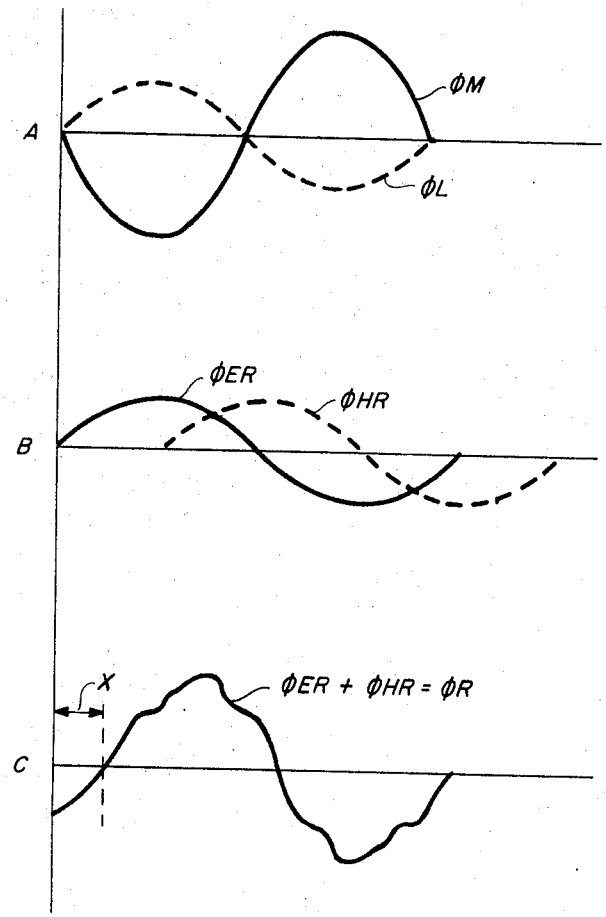
FIGURE 6 is a diagram of the waveforms of several of the fluxes linking the eddy current probe.

FIGURE 6 diagrammatically shows the approximate waveforms of the pertinent fluxes which pass through the pick-up coils 75 and 76. FIG. 6A shows the phase relationship between the main flux $\phi M$ and the net flux $\phi L$ across the electrically connected pick-up coils 75 and 76. The net flux $\phi L$ is either in phase with $\phi M$ or, as shown, 180° out of phase with $\phi M$. FIG. 6B shows the two components $\phi ER$ and $\phi HR$ of the resultant flux $\phi R$ produced by the integrated eddy currents 78 and 79. It is noted that component $\phi ER$ is 180° out of phase with the main flux $\phi M$ and that component $\phi HR$ lags component $\phi ER$ by 90°. FIGURE 6C shows the waveform of the resultant eddy current flux $\phi R$ obtained by adding the components $\phi ER$ and $\phi HR$. It can be seen that the phase of $\phi R$ differs from that of $\phi L$ by an angle X.

Figure 7:
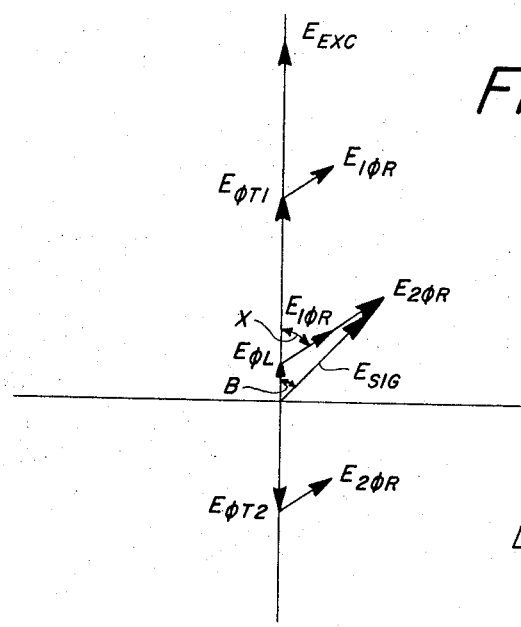
FIGURE 7 is a vector diagram of the voltages across the probe.

FIGURE 7 is a vector diagram showing the pertinent voltages across the excitation coil 74 and the pick-up coils 75 and 76 of the probe 52. $E_{EXC}$ is the excitation voltage applied across the main field coil 74. $E_{\phi T1}$ and $E_{\phi T2}$ are the total voltages induced in the coils 75 and 76, respectively, by the main flux $\phi M$. The net voltage $E_{\phi L}$ across the electrically connected coils 75 and 76 due to flux $\phi M$ is the vector sum of $E_{\phi T1}$ and $E_{\phi T2}$. $E_{\phi L}$ is in phase with $E_{\phi T1}$ inasmuch as $E_{\phi T1}$ is of greater magnitude than $E_{\phi T2}$.

As has previously been mentioned, when the seam 12 of the pipe 11 is not directly below the inner leg 69 of the probe 52, there is a resultant flux $\phi R$ through the pick-up coils 75 and 76 due to the inequality of the eddy currents 78 and 79 induced in the pipe 11. The flux $\phi R$ passing through the coils 75 and 76 induces voltage $E_{1\phi R}$ in coil 75 and voltage $E_{2\phi R}$ in coil 76. Voltages $E_{1\phi R}$ and $E_{2\phi R}$ are in phase with each other and are approximately equal in magnitude, provided the degree of electromagnetic inequality between coils 75 and 76 is small. Said voltages are out of phase with the excitation voltage $E_{EXC}$ by an angle X. The total voltage $E_{SIG}$ across the electrically connected pick-up coils 75 and 76 is equal to the vector sum of $E_{\phi L}$, $E_{1\phi R}$, and $E_{2\phi R}$, and is out of phase with both $E_{\phi L}$ and the excitation voltage $E_{EXC}$ by an angle B. The magnitude of $E_{SIG}$ is relatively unimportant, provided it never decreases below the minimum level detectable by the associated electrical circuits. It is the angle B which is utilized by said circuits to indicate a lateral displacement of the seam 12 with respect to the probe 52.

Figure 9:
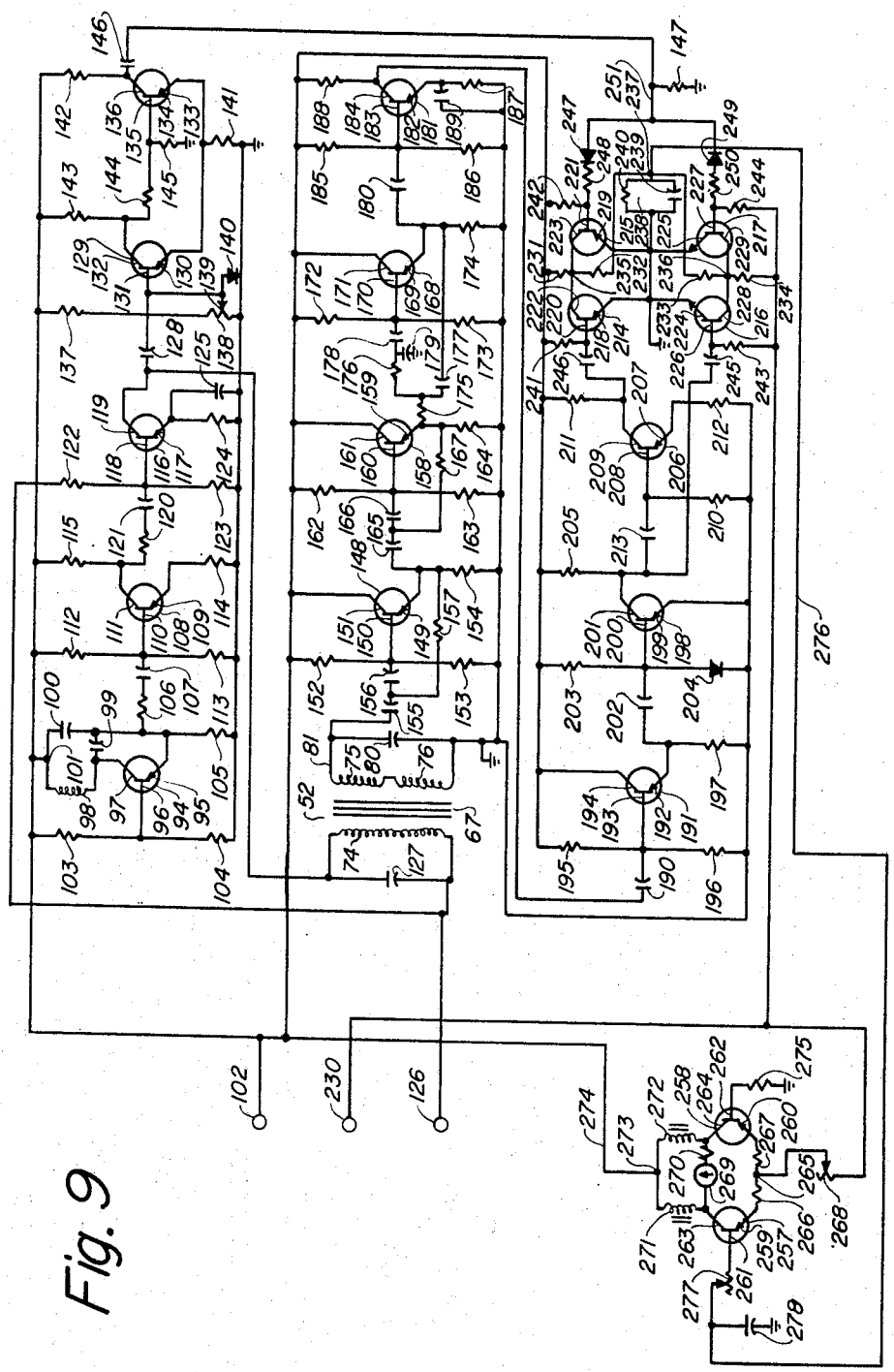
FIGURE 9 is a schematic diagram of the circuits of FIGURE 8.

The total voltage $E_{SIG}$ across the pick-up coils 75 and 76 due to the alternating fluxes therein is very small. In order to obtain a useful signal, a capacitor 80, shown in FIGURE 9, is connected in parallel with the series-connected coils 75 and 76 to provide a resonant circuit 81 tuned to the frequency of the excitation voltage $E_{EXC}$. It is essential to the invention that the resonant circuit 81 be of high quality (high Q), i.e., the circuit is characterized by a narrow band-width and the ratio of the reactance to the resistance in the circuit is high.

While a high Q resonant circuit is generally constructed of high Q components (coils, cores, and capacitors), it is essential to the instant device that the pick-up coils 75 and 76 and the E-shaped core 67 be of low Q. It is thus necessary for capacitor 80 to be of high Q in order for the circuit 81 to be of high Q. Summarizing, the high Q resonant circuit 81 comprises a high Q capacitor connected in parallel with a pair of low Q coils connected in series and wound about the outer legs of a low Q E-shaped core.

The Q of the core 67 must be low to insure that the Q's of the pick-up coils 75 and 76 are low. In addition, a low Q core tends to prevent substantial changes in the inductances of the coils 75 and 76 due to changes in the magnitudes of the fluxes passing through legs 70 and 71 and thus prevents de-tuning of the resonant circuit 81.

The pick-up coils 75 and 76 are of low Q for reasons which will be clear from a reconsideration of FIG. 6. A high Q coil which is being driven at a predetermined frequency tends to pick up signals only if said signals are of the same frequency as that of the driving signal and are either in phase or 180° out of phase therewith. Inasmuch as the pick-up coils 75 and 76 are being driven by voltages induced therein by flux components in phase with the main field flux $\phi M$, it can be seen from FIG. 6B that only voltages induced in coils 75 and 76 by the component $\phi ER$ of the resultant eddy current flux $\phi R$ will be picked up, as $\phi ER$ is 180° out of phase with the main flux $\phi M$. The component flux $\phi HR$, which is 90° out of phase with both the component $\phi ER$ and the main flux $\phi M$ will not be picked up by coils 75 and 76. Inasmuch as the phase shift B which is utilized by the associated electrical circuits to control the motor 21 is due primarily to the component $\phi HR$, the successful operation of the invention is predicated upon the ability of the pick-up coils 75 and 76 to accept voltages in quadrature with the driving voltage. The acceptance of said quadrature voltages is assured by providing the probe 52 with low Q pick-up coils. In addition, the low Q prevents any change in the inductances of the pick-up coils 75 and 76 due to changes in the magnitudes of the fluxes passing through legs 70 and 71 and thus prevents de-tuning of the resonant circuit 81. The Q of the coils 75 and 76 should be no higher than 4, and should preferably be .01 or less.

Figure 8:
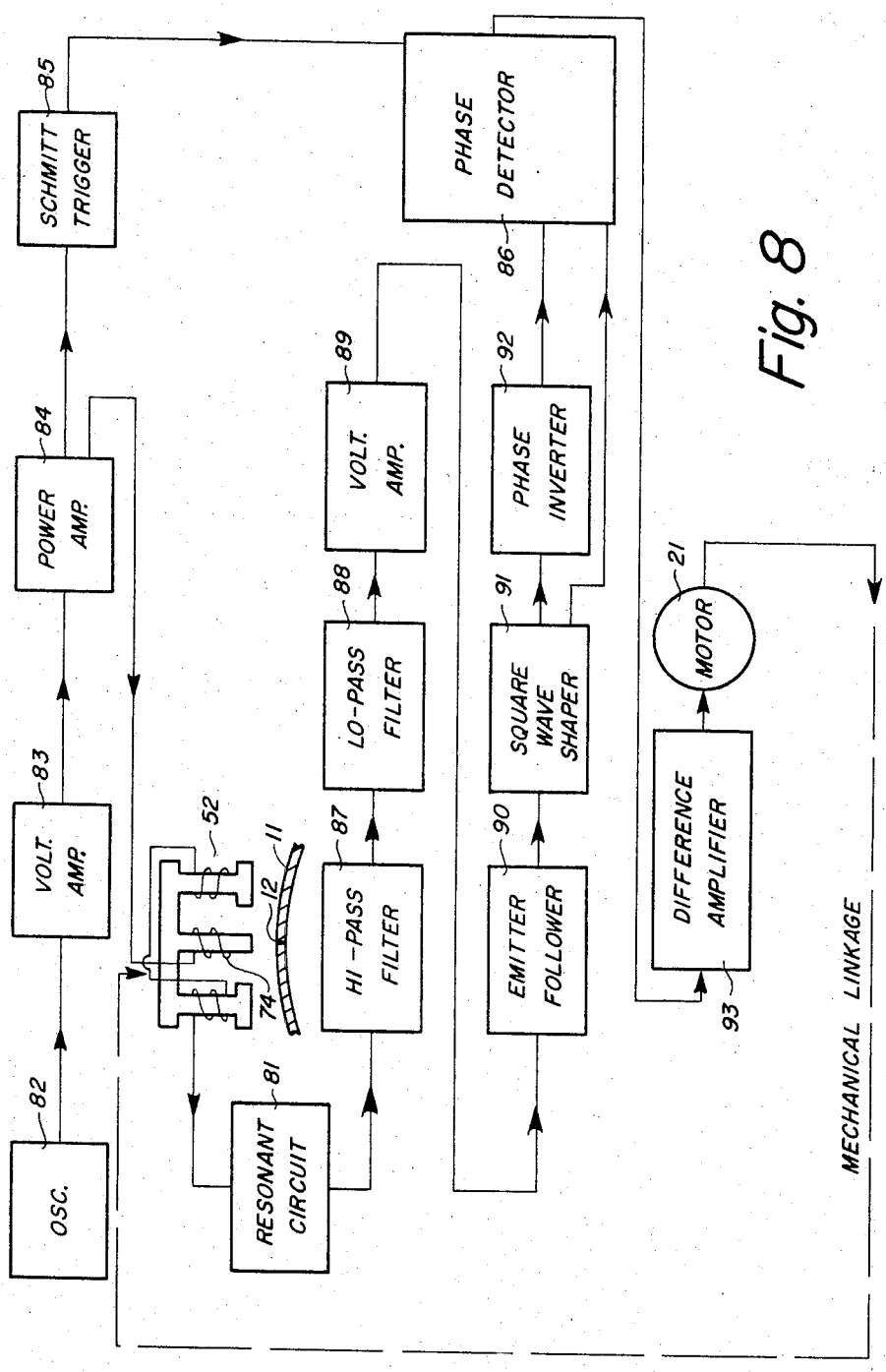
FIGURE 8 is a block diagram of the circuits to which the probe is connected.

The circuits associated with the probe 52 are shown in block diagram form in FIGURE 8. Broadly, the circuits comprise an oscillator 81 which produces a sinusoidal excitation voltage. The oscillator output voltage is amplified by a conventional voltage amplifier 83 and a power amplifier 84 and a portion of the amplified signal is fed to the excitation coil 74 of the probe 52.

The remainder of the amplifier signal is fed to a wave shaping circuit, e.g., a Schmitt trigger 85, which functions to convert the sinusoidal output from the power amplifier 84 into a square wave of identical frequency. The square wave is fed directly to a phase detector circuit 86 to provide a reference signal with which the phase of the signal across the resonant circuit 81 is compared.

The signal across the resonant circuit 81 is fed through high and low pass filters 87 and 88, respectively, which remove substantially all frequency components other than the 5000 c.p.s. component and shift the fundamental in phase by approximately 90°. The filtered signal is then amplified by a voltage amplifier 89 and fed to an emitter follower 90 which couples the signal to a square wave shaper 91. A portion of the output signal from the square wave shaper 91 is fed directly to the phase detector 86, while a second portion is fed through a phase inverter circuit 92 and hence to the phase detector 86.

The output from the phase detector 86 is zero when the probe 52 is properly positioned with respect to the seam 12. When the probe 52 is not properly positioned, the phase detector 86 develops an output signal the magnitude and polarity of which are dependent upon the magnitude and direction of the phase shift of the signal across the resonant circuit 81. In the preferred embodiment of the invention, the output signal from the phase detector 86 is fed to a difference amplifier 93 having two sensitive relays as loads. A positive signal from the phase detector 86 results in the actuation of one of the relays while a negative signal results in the actuation of the other. The relays control the energization of the reversible A.C. motor 21.

A detailed description of the circuits shown as blocks in FIG. 8 will be made with reference to the schematic diagram of FIGURE 9. The oscillator circuit 82 comprises a PNP transistor 94 having an emitter 95, a base 96, and a collector 97. The collector 97 is connected to a tank circuit comprising the coil 98 and the capacitors 99 and 100. The junction 101 of the capacitor 100 and the coil 98 is connected to a source 102 of negative D.C. potential, e.g., −30 volts. Bias resistors 103, 104 and 105 are provided to establish the D.C. operating point of the transistor 94. A resistor 106 and a capacitor 107 couple a portion of the oscillator voltage to the voltage amplifier 83.

The voltage amplifier 83, which operates as a degenerative class A amplifier, comprises a PNP transistor 108 having an emitter 109, a base 110, and a collector 111. Resistors 112, 113, and 114 are provided to establish a D.C. operating point for the transistor 108. Resistor 114 is unbypassed so that the input impedance to the amplifier 83 is high and so the operating characteristics of the amplifier 83 are linear. Resistor 115 is connected from the source 102 to the collector 111 and constitutes the amplifier load.

The power amplifier 84 comprises a PNP transistor 116 having an emitter 117, a base 118, and a collector 119. The output signal from the voltage amplifier 83 is coupled to the base 118 of the transistor 116 through a resistor 120 and a capacitor 121. Resistors 122, 123, and 124 are provided to establish a D.C. operating point for the transistor 116. Resistor 124 is bypassed by a capacitor 125 to prevent variations in emitter bias due to variations in load current. The collector 119 is connected to one side of the excitation coil 74 of the probe 52. The other side of the coil 74 is connected to a source 126 of negative potential, e.g., −50 volts. Due to the inductance of the probe 52, a capacitor 127 is connected across the coil 74 to prevent damage to the transistor 116 and to insure that the voltage across the coil 74 is substantially sinusoidal. The parallel combination of the coil 74 and the capacitor 127 provides the load for the transistor 116.

A portion of the signal across the excitation coil 74 is coupled to the Schmitt trigger 85 by a capacitor 128.

The Schmitt trigger comprises a PNP transistor 129 having an emitter 130, a base 131, and a collector 132 and a PNP transistor 133 having an emitter 134, a base 135, and a collector 136. A resistor 137 and a potentiometer 138 form a voltage divider network. The tap 139 of the potentiometer 138 is connected to the base 131 of the transistor 129 and provides means for adjusting the symmetry of the output signal from the Schmitt trigger 85. The tap 139 is connected through a diode 140 to ground. The diode 140, in combination with the resistor 137 and the potentiometer 138, provides means for determining the voltage level which initiates conduction in the transistor 129. The emitters 130 and 134 of the transistors 129 and 133, respectively, are connected to a common bias resistor 141. A resistor 142 provides the load for the transistor 133 and a resistor 143 provides the load for the transistor 129. The resistor 143 is also one branch of the voltage divider network comprising the resistors 143, 144, and 145.

The components of the Schmitt trigger 85 are chosen so that, in the absence of a sufficiently negative signal at the base 131 of the transistor 129, transistor 129 is cut off and transistor 133 is in saturated conduction. A sufficiently large negative signal at the base 131 of the transsistor 129, however, reverse biases the diode 140 and forward biases the transistor 129. The increasing load current through the resistor 143 results in a decrease of the forward bias on the base 135 of the transistor 133. Regenerative feedback between transistors 129 and 133 continues until transistor 129 is in saturated conduction and transistor 133 is cut off.

The schmitt trigger 85 converts the input signal, which is substantially sinusoidal, to a square wave of the same phase and frequency as that of the sinusoid. The square wave output is coupled to the phase detector circuit 86 by a capacitor 146 and a leakage resistor 147. The square wave provides a reference signal with which the phase of the voltage across the resonant circuit 81, which is also converted to a square wave, is compared. By using square wave inputs to the phase detector 86, the detector output is unaffected by variations in the amplitudes of the input signals.

The signal across the resonant circuit 81 is fed through an active unsymmetrical band pass filter comprising a high pass filter 87 and a low pass filter 88. The high pass filter 87 comprises two identical sections. The first section comprises a PNP transistor 148 having an emitter 149, a base 150, and a collector 151. Resistors 152 and 153 are provided to establish the D.C. operating points for transistor 148 and resistor 154 is provided as the load. The remaining components of the filter are capacitors 155 and 156 and feedback resistor 157.

Transistor 148 functions as an emitter follower and is characterized by a high input impedance and a low output impedance. The input impedance is determined primarily by the combination of resistors 152 and 153. The combination of resistors 152 and 153 and capacitor 156 comprises a first R-C network. The combination of resistor 157 and capacitor 155 comprises a second R-C network. The values of the components of each R-C network are selected so that the time constant of each network is equal and the capacitive reactance is equal to the resistance at the frequency of the excitation voltage, vis., 5000 cycles per second.

The second section of the high pass filter 87 is identical to the first and comprises a PNP transistor 158 having an emitter 159, a base 160, and a collector 161. Resistors 162 and 163 are provided to establish the D.C. operating point of transistor 158 and a resistor 164 is provided as the load. Capacitors 165 and 166 and feedback resistor 167 are components of the R-C networks.

Each high pass section provides an attenuation of 12 db per octave below 5000 cycles per second. Inasmuch as the welding current is 60 cycles per second, voltages induced in the pick-up coils 75 and 76 by the welding current are attenuated by more than 120 db by the two high pass sections.

The low pass filter 88 is similar to one section of the high pass filter 87 and comprises a PNP transistor 168 having an emitter 169, a base 170, and a collector 171. Resistors 172 and 173 are provided to establish a D.C. operating point and a resistor 174 is provided as the load. Resistors 175 and 176 and capacitors 177, 178, and 179 are components of the R-C networks. The low pass filter 88 provides an attenuation of 12 db per octave above 5000 cycles per second and filters out the second harmonic of the excitation voltage as well as spurious higher order frequencies generated by the welding current.

The band pass filter, besides filtering out undesired frequency components, serves to shift the phase of the 5000 c.p.s. signal by 90°.

The output signal from the low pass filter 88 is coupled to a class A voltage amplifier 89 by a capacitor 180. The amplifier 89 comprises a PNP transistor 181 having an emitter 182, a base 183, and a collector 184. Resistors 185, 186 and 187 are provided to establish the D.C. operating point and a resistor 188 is the load. Capacitor 189 is an A.C. bypassing capacitor for the emitter resistor 187.

The signal from the voltage amplifier 89 is coupled to an emitter follower 90 by a capacitor 190. The emitter follower 90 comprises a PNP transistor 191 having an emitter 192, a base 193, and a collector 194. Resistors 195 and 196 are provided to establish the D.C. operating point of transistor 191 and resistor 197 is the load. The emitter follower 90 functions to match the impedance between the output of the voltage amplifier 89 and the input of the square wave shaper 91.

The square wave shaper 91 comprises a PNP transistor 198 having an emitter 199, a base 200, and a collector 201. The signal from the emitter follower 90 is coupled to the base 200 by a capacitor 202. Resistor 203 is provided to forward bias the base-emitter diode of transistor 198. A diode 204 is connected between the base 200 and ground. A resistor 205 is the load.

The function of the square wave shaper 91 is to convert the sinusoidal output signal from the emitter follower 90 to a square wave with the same zero crossing points as those of the sinusoid. Positive excursions of the sinusoid are shunted to ground through diode 204, thereby cutting off transistor 198. Negative excursions of the sinusoid have no effect on the circuit, inasmuch as transistor 198 is forward biased to saturation and the collector 201 is essentially at ground potential. The voltage across the load resistor 205 is thus a symmetrical square wave, the magnitude of which swings from ground potential to the value of the collector supply voltage, i.e., −30 volts.

A portion of the output signal from the square wave shaper 91 is fed to the phase detector circuit 86, while the remainder of said signal is fed to a phase inverter 92 and hence to the phase detector circuit 86. The phase inverter 92 comprises a PNP transistor 206 having an emitter 207, a base 208, and a collector 209. Resistor 210 is provided to establish the D.C. operating point, resistor 211 is the load resistor, and resistor 212 is an unbypassed emitter resistor. The signal is coupled to the base 208 of transistor 206 by a capacitor 213. The signal across the load resistor 211 is 180° out of phase with the input signal.

The phase detector circuit 86 broadly comprises PNP transistors 214 and 215 and NPN transistors 216 and 217. Transistors 214 and 215 have emitters 218 and 219, bases 220 and 221, and collectors 222 and 223, respectively. Transistors 216 and 217 have emitters 224 and 225, bases 226 and 227, and collectors 228 and 229, respectively. Connected between the source 102 and a source 230 of positive D.C. potential equal in magnitude to source 102 is a voltage divider network comprising resistors 231, 232, 233, and 234. It is essential for resistor 231 to be equal to resistor 234 and resistor 232 to be equal to resistor 233. In the instant device, each of said resistors has a value of 10K ohm. The collectors 222 and 223 are connected to the junction 235 of resistors 231 and 232. The collectors 228 and 229 are connected to the junction 236 of resistors 233 and 234. The phase detector output is taken from the junction 237 of resistors 232 and 233. Junction 237 is connected to an integrating network 238 comprising a capacitor 239 and a resistor 240.

The emitters 218, 219, 224, and 225 are all connected directly to ground. The bases 220 and 221 are supplied with sufficient bias current through resistors 241 and 242, respectively, to drive transistors 214 and 215 into saturated conduction in the absence of an input signal. The bases 226 and 227 are supplied with sufficient bias current through resistors 243 and 244, respectively, to drive transistors 216 and 217 into saturated conduction in the absence of an input signal. The output signal from the wave shaper 91 is coupled to the base 226 of transistor 216 by a capacitor 245. The output signal from the phase inverter 92 is coupled to the base 220 of transistor 214 by a capacitor 246. Positive half cycles of the output signal from the Schmitt trigger 85 are coupled to the base 221 of transistor 215 by a diode 247 and a current limiting resistor 248. Negative half cycles of the output signal from the Schmitt trigger are coupled to the base 227 of transistor 217 by a diode 249 and a current limiting resistor 250. Diodes 247 and 249 are utilized to isolate transistor 215 from transistor 217, inasmuch as the input signal to both transistors is fed along a common conductor 251. In lieu of the diodes 247 and 249, it is obvious to one skilled in the art that the output signal from the Schmitt trigger 85 can be divided into separate positive and negative waves and individually coupled to the bases 221 and 227 of the transistors 215 and 217, respectively.

Figure 10:
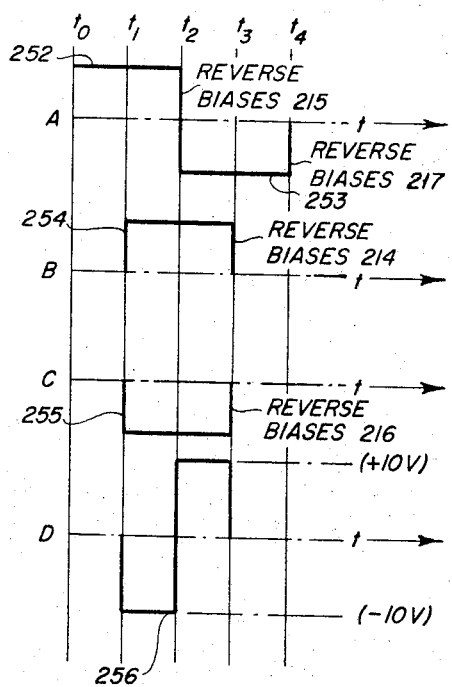
FIGURE 10 is a diagram of the input and output voltages of the phase detector circuit when the eddy currents induced in the materials forming the seam are of the desired distribution.

FIGURE 10 shows the time relationships of the various signals fed into the phase detector 86 when the probe 52 is properly positioned with respect to the seam 12. FIG. 10A shows the square wave output of the Schmitt trigger 85. The positive half cycle 252 fed to the base 221 of transistor 215 is sufficiently large to reverse bias transistor 215 beyond cut-off. The negative half cycle 253 fed to the base 227 of transistor 217 is sufficiently large to reverse bias transistor 217 beyond cut-off. FIGURE 10B shows the positive pulse output signal 254 of the phase inverter 92. The signal 254 is sufficiently large to reverse bias transistor 214 beyond cut-off. FIGURE 10C shows the negative pulse output signal 255 of the wave shaper 91. The signal 255 is sufficiently large to reverse bias transistor 216 beyond cut-off.

The operation of the phase detector circuit 86 is substantially as follows. Transistors 214 and 215 function as parallel switches which, when either of which is closed (i.e., when either transistor is in saturated conduction), essentially ground junction 235 through the saturated transistor. Transistors 216 and 217 also function as parallel switches which, when either of which is closed, essentially ground junction 236 through the saturated transistor.

The input signal from the Schmitt trigger 85 alternately cuts off transistors 215 and 217, while the input signals from the phase inverter 92 and the wave shaper 91 simultaneously cut off transistors 214 and 216. From time $t_0$ to $t_1$, transistor 215 is cut off and transistors 214, 216, and 217 are in saturated conduction. Thus both junctions 235 and 236 are grounded during this time interval. Junction 237, which is located at the midpoint of the voltage divider network, is therefore also grounded. From time $t_1$ to $t_2$ transistors 214, 215, and 216 are cut off and transistor 217 is in saturated conduction. Therefore junction 236 remains at ground potential during this time interval but the potential at junction 235 changes from zero to a value substantially equal to two-thirds of the potential of the negative source 102. The potential at junction 237 changes correspondingly from zero to a value substantially equal to one-third of the potential of the negative source 102. The signal 256 at junction 237, in the absence of the integrating network 238, during this time interval is shown in FIG. 10D.

At time $t_2$ the polarity of the input signal from the Schmitt trigger 85 substantially instantaneously reverses from positive to negative. This polarity reversal results in the return of transistor 215 to saturated conduction and the cutting off of transistor 217, while the conduction states of transistors 214 and 216 remain the same as during the time interval $t_1$ to $t_2$. From times $t_2$ to $t_3$ transistors 214, 216, and 217 are cut off and transistor 215 is in saturated conduction. Thus junction 235 is grounded during this time interval. The potential at junction 236 changes from zero to a value substantially equal to two-thirds of the potential of the positive D.C. source 230. The potential at junction 237, in the absence of the integrating network 238, changes correspondignly from zero to a value substantially equal to one-third of the potential of the positive source 230.

At time $t_3$, transistors 214 and 216 substantially instantaneously return to a state of saturated conduction and junctions 235, 236, and 237 are all at ground potential during the time interval from $t_3$ to $t_4$. Inasmuch as the time interval from $t_1$ to $t_2$ equals that from $t_2$ to $t_3$, the voltage across the integrating network 238 during the entire time interval from $t_0$ to $t_4$ is equal to zero.

Figure 11:
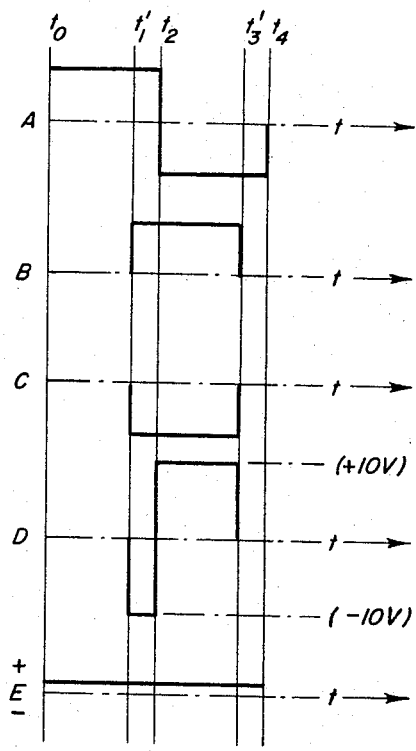
FIGURE 11 is a diagram of the input and output voltages of the phase detector circuit when the eddy currents induced in the materials are not of the desired distribution.

FIGURE 11 shows the waveforms of the signals fed into the phase detector 86 at an instant when the probe 52 is not properly positioned with respect to the seam 12 of the pipe 11. The output signal from the Schmitt trigger 85, shown in FIG. 11A, is unchanged. However, the output signals from the phase inverter 92 and the wave shaper 91, shown in FIGS. 11B and 11C, are shifted in time by an amount and in a direction dependent upon the magnitude and direction of the shift of the seam 12 with respect to the probe 52. The output signals from the phase inverter 92 and the wave shaper 91 exist from $t_1'$ to $t_3'$. The resultant potential at junction 237, in the absence of the integrating network 238, is shown in FIG. 11D. The actual voltage output from the phase detector circuit 86 is shown in FIG. 11E.

The D.C. voltage across the integrating network 238 fully describes the position of the probe 52 with respect to the seam 12. In the preferred embodiment of the invention, said voltage is fed to a difference amplifier 93. The difference amplifier 93 comprises two PNP transistors 257 and 258 having emitters 259 and 260, bases 261 and 262, and collectors 263 and 264, respectively. The emitters 259 and 260 are connected to a junction 265 through current limiting resistors 266 and 267. The junction 265 is connected to a potentiometer 268 which is in turn connected to the source 230. The collectors 263 and 264 are connected together through a microammeter 269 and a current limiting resistor 270. The microammeter 269, which is of the zero center type, provides means for visually indicating the relative position of the probe 52 with respect to the seam 12. The collectors 263 and 264 are further connected to a pair of sensitive relays 271 and 272 which are adapted to energize the reversible A.C. motor 21. The relays 271 and 272 are connected to a common junction 273 which is connected to the source 102 by a conductor 274. A current limiting resistor 275 is connected from the base 262 of transsitor 258 to ground. The signal across the integrating network 238 is fed through a conductor 276 and is coupled to the difference amplifier 93 by means of a potentiometer 277. A filter capacitor 278 is provided to remove any A.C. components from the incoming signal.

The difference amplifier 93 operates in substantially the following manner. Potentiometer 268 is adjusted to obtain the desired quiescent collector currents and potentiometer 277 is adjusted to control the level of the input signal required for one of the relays 271 and 272 to close. As the input current to the base 261 of transistor 257 increases negatively, the current through transistor 257 increases and the current through transistor 258 decreases.

A sufficiently large current through transistor 257 causes relay 271 to close. Conversely, as the input current to the base 261 of transistor 257 increases positively, the current through transistor 257 decreases and the current through transistor 258 increases. A sufficiently large current through transistor 258 causes relay 272 to close.

As a specific example of the phase detector circuit, which I believe to be novel, the following components may be utilized:

| Component | Value |
| --- | --- |
| Transistors 214 and 215 | 2N1125 |
| Transistors 216 and 217 | 2N35 |
| Diodes 247 and 249 | 1N34A |
| Resistors 231, 232, 233, and 234 ohms | 10K |
| Resistor 240 do | 68K |
| Resistors 241, 242, 243, and 244 do | 100K |
| Resistors 248 and 250 do | 10K |
| Capacitor 239 mfd | .05 |
| Capacitor 245 mfd | .033 |
| Capacitor 246 mfd | .02 |

It is to be understood that the values for the components of the phase detector circuit may vary in accordance with the particular application of the circuit.

From the above description of the invention and its associated mechanical components and electrical circuits, it is believed the operation of the invention is clear in connection with automatic positioning devices. When the probe 52 is properly positioned with respect to the seam 12 of the pipe 11, alternating current in the excitation coil 74 results in equal fluxes linking the pipe 11 on each side of the seam 12. The eddy currents induced in the pipe 11 are thus equally distributed on each side of the seam 12, and the fluxes resulting from said eddy currents are equal in magnitude and 180° out of phase. The total voltage across the pick-up coils 75 and 76 is thus due only to the electromagnetic inequality of the coils 75 and 76, and the phase angle B is zero.

The input signals to the phase detector circuit 86 from the wave shaper 91 and the phase inverter 92 are therefore 90° out of phase with the input signal from the Schmitt trigger 85, and the voltage across the integrating network 238 is zero. The difference amplifier 93 thus receives no input signal, and the motor 21 remains deenergized.

Should the seam 12 of the pipe 11 experience a lateral displacement with respect to the probe 52, alternating current in the excitation coil 74 results in a larger flux linking the pipe 11 on one side of the seam 12 than on the other side of the seam 12. This inequality in flux alters the eddy current distribution on each side of the seam 12, and results in a net voltage induced in the pick-up coils 75 and 76 which is out of phase with the excitation voltage by an angle B.

The input signals fed to the phase detector circuit 86 from the wave shaper 91 and the phase inverter 92 are therefore out of phase with the input signal from the Schmitt trigger 85 by an angle of 90° ±B, and the voltage across the integrating network 238 differs from zero by an amount dependent upon the magnitude of B. The difference amplifier 93 thus receives an input signal and, if the signal is of sufficient magnitude, causes the motor 21 to be energized. Energization of the motor 21 causes the carriage 27, and therefore the probe 52, to be re-positioned until the angle B returns to zero.

While the invention has been described in connection with automatic following devices, there are many other instances in which a D.C. signal indicative of a departure from a predetermined eddy current distribution in conductive materials can be advantageously utilized. For example, such a signal can be utilized in the detection of flaws in materials, inasmuch as the electrical and magnetic properties of the materials in the vicinity of a flaw differ from those where there is no flaw.

Changes and modifications of this invention will undoubtedly occur to those skilled in the art and I therefore do not wish to be limited to the exact embodiments shown and described but may use such substitutions, modifications or equivalents thereof as are embraced within the scope of my invention or as pointed out in the claims.

I claim:

1. Apparatus responsive to a discontinuity in a conductive material, comprising:
    (a) a source of alternating current,
    (b) means disposed in inductive relation with said conductive material, comprising:
        a substantially E-shaped ferromagnetic core having an inner leg and first and second outer legs, the geometry of said core being such that, when said core is inductively coupled to said material, the reluctance between said inner leg and said material is substantially greater than the reluctance between either of said outer legs and said material,
        first coil means, connected to said source and coupled to said inner leg, for inducing eddy currents in said material,
        second coil means comprising first and second electromagnetically unequal pick-up coils wound about said first and second outer legs, respectively, said pick-up coils being connected to each other so that voltages induced therein by flux produced by current in said first coil means are in series opposition,
    (c) means, connected to said second coil means, for producing a D.C. signal dependent upon the difference between the phase of the voltage induced in said pick up coils by current in said first coil means and the phase of the vectorial sum of all the voltages induced in said pick up coils.

2. Apparatus as recited in claim 1, in which said core is symmetrical and said pick-up coils are of a Q no higher than 4.

3. Apparatus as recited in claim 2, in which a capacitor is connected across said second coil means to form a circuit resonant at the frequency of said alternating current.

4. Apparatus as recited in claim 3, in which said first pick-up coil has a greater number of turns than said second pick-up coil.

5. Apparatus as recited in claim 4, in which said first and second outer legs are provided with pole pieces the cross-sectional areas of which are large in comparison with the cross-sectional area of said inner leg.

References Cited

UNITED STATES PATENTS

| | | | |
| --- | --- | --- | --- |
| 2,135,675 | 11/1938 | Palmer | 324—40 |
| 2,238,091 | 4/1941 | Zuschlag | 324—40 |
| 2,774,038 | 12/1956 | Stavis | 324—87 |
| 2,781,489 | 2/1957 | Petrides | 324—87 |
| 2,921,298 | 1/1960 | Jackson | 324—34 |
| 3,017,496 | 1/1962 | Greene | 219—125 |
| 3,179,786 | 4/1965 | Greene | 219—125 |
| 3,201,562 | 8/1965 | Anderson | 324—40 |

FOREIGN PATENTS

| | | |
| --- | --- | --- |
| 716,410 | 10/1931 | France. |
| 573,182 | 11/1945 | Great Britain. |

RUDOLPH V. ROLINEC, *Primary Examiner.*

RICHARD B. WILKINSON, *Examiner.*

R. J. CORCORAN, *Assistant Examiner.*

UNITED STATES PATENT OFFICE

CERTIFICATE OF CORRECTION

Patent No. 3,359,486                  December 19, 1967

Daniel R. Brosious

It is hereby certified that error appears in the above numbered patent requiring correction and that the said Letters Patent should read as corrected below.

Column 7, line 71, for "oscillator 81" read -- oscillator 82 --; column 12, line 62, for "transsitor" read -- transistor --.

Signed and sealed this 21st day of January 1969.

(SEAL)
Attest:

Edward M. Fletcher, Jr.                  EDWARD J. BRENNER

Attesting Officer                        Commissioner of Patents